UNITED STATES PATENT OFFICE.

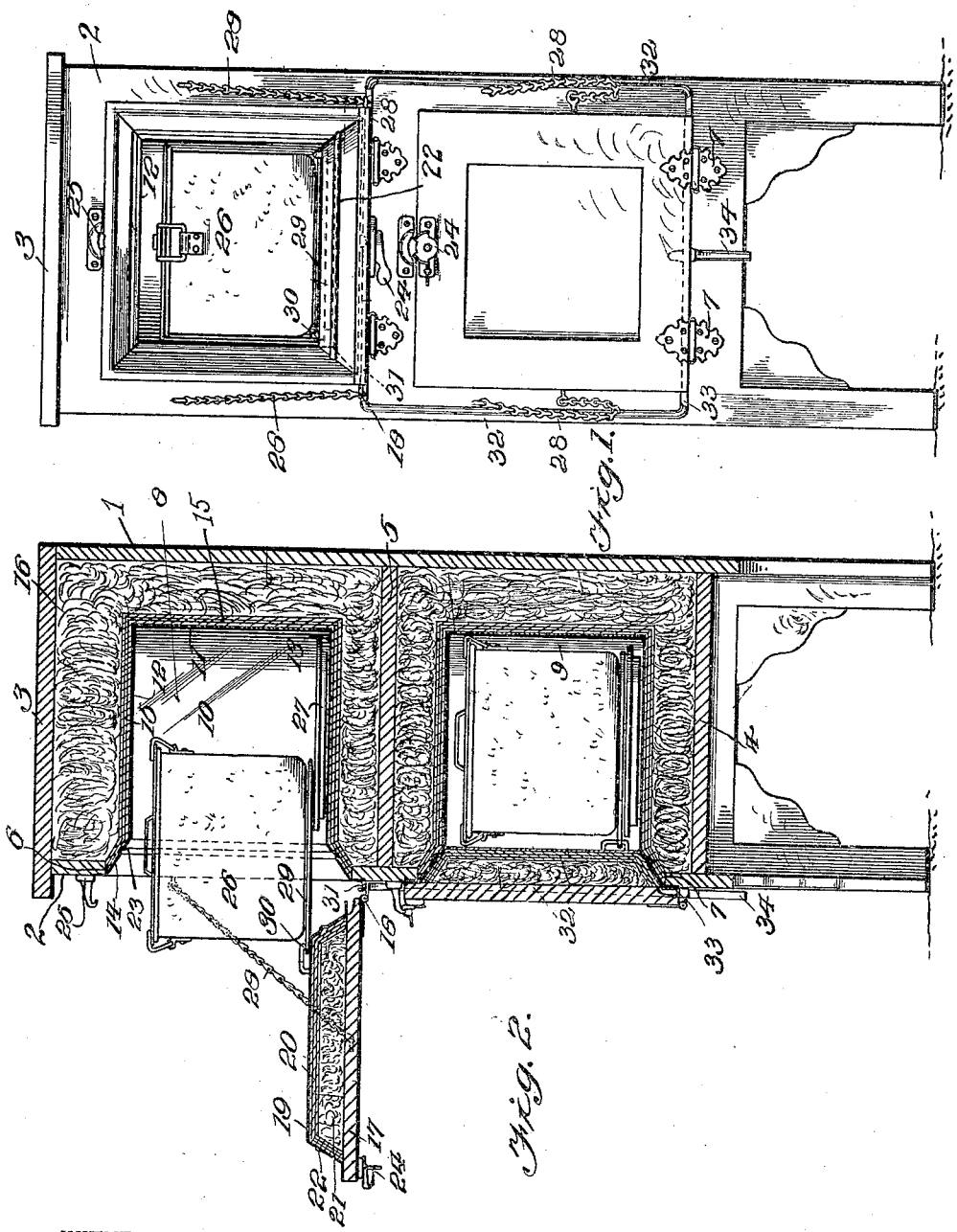

FRED H. HARPER, OF WICHITA, KANSAS.

FIRELESS COOKER.

1,136,600.  Specification of Letters Patent.  Patented Apr. 20, 1915.

Application filed January 9, 1912. Serial No. 670,272.

*To all whom it may concern:*

Be it known that I, FRED H. HARPER, citizen of the United States, residing at Wichita, in the county of Sedgwick and State of Kansas, have invented certain new and useful Improvements in Fireless Cookers, of which the following is a specification.

It is the object of the present invention to provide a fireless cooker which will present marked advantages over such cookers as are now in general use.

The ordinary form of fireless cooker consists of a two-part casing or oven into which the vessel containing the food stuff to be cooked, is placed, one part or section of the oven constituting the body thereof and the other section the top or cover. Such cookers present the disadvantage that they are inconvenient to use, due to the manner of assembling the body and cover of the oven, and to the fact that the vessel must be lifted from the oven.

The ordinary fireless cooker is particularly undesirable for use, for the reason that it is of such length that it cannot be conveniently arranged within the ordinary kitchen and if it becomes necessary to stir the contents of the cooking utensil within the vessel, the steam and odors from the contents will ascend in one's face.

The present invention therefore, aims to provide a cooker which may be as conveniently used as the ordinary cooking range, and in which the vessel is inserted and removed through a doorway in one side of the oven. In short, the invention contemplates the provision of a fireless cooker in which the ovens are arranged in horizontal position and open at one side of the casing or body of the cooker, the doors for the ovens being arranged to be swung out from the said side so that access may be had to the ovens, and it will be readily understood that with such an arrangement of ovens, the structure may be embodied in a sideboard, refrigerator, cupboard, or other article of furniture.

The invention also aims to provide a vessel supporting rack or member which is housed within the oven when the oven door is closed, but which will be automatically moved to extend through the doorway of the oven when the door is swung to open position so as to afford a support for the vessel containing the food stuff cooked, and when the said door is hinged at the lower side of the doorway to swing downwardly to open position, this support is arranged to extend over the space between the hinged side of the door and the bottom of the oven or the top of the radiator so that the vessel may be more readily placed within or removed from the oven, means being provided for supporting the door when in open position, substantially horizontal, so as to afford a further support for the said vessel.

Another object of the invention is to disclose a novel oven structure which will retain the heat given off from the radiator within the oven, for a greater period of time than ovens of ordinary construction.

Incidentally, it is an aim of the invention to so construct the walls of the door opening of the oven, and the door for closing this opening, as to prevent the escape of hot air currents between the door and the said walls of the door opening, and prevent the entrance of cold air currents.

For a full understanding of the invention reference is to be had to the following description and accompanying drawing, in which:—

Figure 1 is a front elevation of the fireless cooker embodying the present invention, the door for the upper oven being shown open and that for the lower oven closed. Fig. 2 is a vertical sectional view through the cooker taken in a plane from front to rear.

Corresponding and like parts are referred to in the following description and indicated in all the views of the accompanying drawing by the same reference characters.

In the drawings, the ovens of the fireless cooker are illustrated as arranged within a casing which includes a back 1 and a front 2. The casing also includes a top 3 and a bottom 4, and a partition 5 is arranged within the casing between the top and bottom and between the front and back and divides the casing into two compartments within each of which there is arranged one of the ovens of the cooker, as will be presently explained.

The front of the casing is formed above the partition 5, with an opening 6 and below the partition with an opening 7 and that oven which is arranged within the upper compartment or above the partition 5 is indicated by the numeral 8, and the one which is arranged within the lower compartment is indicated by the numeral 9. These ovens are of counterpart construction and consequently a description of one will suffice for both. Each oven consists of a box or body which is preferably formed of sheet-metal and has side walls 10, a rear wall 11, which is preferably curved to conform to the contour of the vessel to be disposed within the oven, a top wall 12, and a bottom wall 13, the said body being open at its front and having its side, top and bottom walls extended so as to form a flaring door opening 14 secured at its sides within the opening 6. It will be understood at this point that the walls of the door opening of the lower oven are secured in the opening 7. The sheet-metal body of the oven is covered with one or several layers 15 of asbestos or other thermo-insulating material. It is to be noted at this point that the ovens are disposed horizontally and that they open at the front of the casing or cabinet within which they are arranged. The walls of each oven are spaced from the walls of the respective compartment of the casing and this space between the said walls is filled with a packing 16 of asbestos fiber, mineral wool, paper pulp or sheet fiber, or in fact in any other suitable thermo-insulating material.

The door opening of each oven is closed by a suitable door comprising a flat body portion 17 hinged as at 18 to the front of the casing at the lower side of the door opening of the respective oven, and to the inner side of the body of each door there is secured a sheet metal jacket 19 interiorly lined with sheet asbestos or other thermo-insulating sheet material 20 and packed as at 21 with material such as that before mentioned and indicated by the numeral 16. The sides of the jacket 19 of each door are inclined so that the jacket will fit snugly within the door opening of the respective oven when the door is in closed position, and in order to insure an air tight fit the sides of the jacket are formed with a continuous rib 22 preferably stamped in the sides of the jacket 19, and this rib seats in a groove 23 similarly formed in the walls of the door opening. A suitable latch 24 is preferably mounted upon each door at its free side and is engageable with a keeper 25 at the upper side of the respective door-opening.

From inspection of Fig. 1 of the drawing, it will be observed that the vessel in which the food stuff is to be cooked, indicated by the numeral 26, is to be placed within and removed from its respective oven through the door opening therein and is to rest upon a radiator or similar heating device 27 disposed upon the bottom wall of the oven. Chains or any other suitable connections 28 are secured to the front of the casing at opposite sides of each door opening therein and to opposite sides of each door, and these chains serve to support the door in substantially horizontal position when it has been swung open. In order that the vessels 26 may be conveniently placed within the respective ovens and may be conveniently removed therefrom, or supported in front of the oven while the food stuff within is being inspected, there is provided in connection with each of the doors, a vessel support 29 which may be in the nature of a plate either perforated or imperforate, or a wire frame, and this support is hinged at each forward corner to the inner side of the door near its hinged edge, by means of staples 30 and the free end of this plate rests upon the radiator 27 in the manner illustrated in Fig. 2 of the drawing. When the door of either oven is closed the vessel support 29 will rest flat upon the radiator 27 within the oven and the vessel 26 will be supported upon the support in the manner illustrated in Fig. 2. When the door is swung to open position, the support will be pulled forwardly, carrying with it the vessel 26 and will span the space between the hinged side of the door and the said radiator, it being understood that the vessel may be slid onto what will then be the upper side of the door, if desired, and in returning it to the oven it may be slid onto the support and the door swung up to closed position.

In order that any liquid spilled in either oven or any water or condensation may be carried off without being allowed to run over the front of the cooker, a small gutter 31 is formed across the front of the cooker just below the lower edge of the upper door and above the lower leaves of the upper hinges, and this trough or gutter is arranged to discharge at each outer end into a gutter or trough 32 which extends from the said ends of the trough 31 down each side of the cooker a short distance from each side of the lower door and discharges or leads into a trough 33 which passes just below the lower door or just above the lower leaves of the hinges of the lower door and discharges immediately under the center of the lower door into a trough or guide 34. This trough 34 leads to a point just below the body of the cooker where it may be allowed to drip into a refrigerator pan or other suitable receptacle.

The arrangement of the cooker and troughs or guides, herein shown and described, is to be preferred where two ovens are employed and arranged in the manner illustrated, but it will be readily understood that where a single oven is used, or where there is some other arrangement of the ovens, the drip troughs may be advantageously arranged otherwise than as here shown.

It will be apparent from the foregoing that the principles of the present invention may be embodied in a fireless cooker in which there is provided but a single oven or any number of ovens, regardless of the manner in which the ovens are arranged. Also it will be apparent that the supports 29, might if desired, be hingedly mounted within the oven and have operative connection with the door whether the door be arranged to swing downwardly to open position or about a vertical axis.

It will be readily understood that if desired, the door may be hinged at one lateral edge instead of at its lower side and that the support 29 may then have any suitable operable connection with the door whereby it will be moved outwardly to extend through the door opening when the door is swung to open position. It will also be understood that the casing may be supported upon legs or standards, as shown in the drawing, or may rest directly upon its bottom, or that the structure herein shown may be embodied in a sideboard, cupboard, or other similar article of furniture.

Having thus described the invention what is claimed as new is:—

1. In a fireless cooker, a casing, ovens arranged within the casing one above the other, the casing being provided in one wall with door openings at which the open sides of the ovens are presented, a door arranged to close each of the door openings, and a drain device including a trough extending across the said wall of the casing at the lower side of each of the door openings, conduits connecting the troughs at their ends, and a drain leading from the lower trough.

2. In a fireless cooker, a casing, an oven arranged within the casing, a door closure for the open side of the oven, the door being arranged to swing downwardly to open position, means for supporting the door in open position, a thermo radiator plate disposed upon the bottom of the oven, a plate slidably disposed upon the thermo radiator plate, and spaced members upon the inner face of the door pivotally engaging the said slidable plate adjacent its forward edge, the points of pivotal engagement of the members with the slidable plate being in a horizontal plane with the plate both when the door is in open and closed position and the said plate, when the door is in open position being arranged to span the space between the door and the surface of the thermo radiator plate and constituting a support for a utensil disposed therein.

In testimony whereof I affix my signature in presence of two witnesses.

FRED H. HARPER. [L. S.]

Witnesses:
IRWIN H. STEARNS,
CARL H. DAVIS.

Copies of this patent may be obtained for five cents each, by addressing the "Commissioner of Patents Washington, D. C."